United States Patent [19]

Savinell et al.

[11] Patent Number: 4,968,477
[45] Date of Patent: Nov. 6, 1990

[54] METHOD AND APPARATUS FOR REMOVING THE FUEL RODS OF A NUCLEAR FUEL ASSEMBLY

[75] Inventors: Alan Savinell, Penn Hills; Donald G. Sherwood, Monroeville, both of Pa.

[73] Assignee: Westinghouse Electric Corp., Pittsburgh, Pa.

[21] Appl. No.: 304,687

[22] Filed: Feb. 2, 1989

[51] Int. Cl.⁵ .................... G21C 19/10; G21C 19/32
[52] U.S. Cl. .................................................. 376/261
[58] Field of Search .................. 376/261, 260, 272; 414/146

[56] References Cited

U.S. PATENT DOCUMENTS

| | | |
|---|---|---|
| 2,865,829 | 12/1958 | Bellas et al. |
| 2,870,075 | 1/1959 | Leverett et al. |
| 3,206,366 | 9/1965 | Bosshard |
| 3,253,995 | 5/1966 | Antonsen et al. |
| 4,096,031 | 6/1978 | Wade |
| 4,374,801 | 2/1983 | Albin |
| 4,547,117 | 10/1985 | Shields et al. |
| 4,636,351 | 1/1987 | Rohr ................................. 376/272 |
| 4,647,423 | 3/1987 | Hawke |
| 4,647,424 | 3/1987 | Meuschke et al. |
| 4,659,536 | 4/1987 | Baudro |
| 4,673,544 | 6/1987 | Rohr |
| 4,687,245 | 8/1987 | Formanek |
| 4,704,247 | 11/1987 | Wachter ............................ 376/261 |
| 4,714,583 | 12/1987 | Wachter ............................ 376/261 |
| 4,723,358 | 2/1988 | Jung et al. ........................ 376/261 |
| 4,842,809 | 6/1989 | Attix et al. ....................... 376/261 |

FOREIGN PATENT DOCUMENTS 1200374 12/1959 France.

*Primary Examiner*—Daniel D. Wasil

[57] ABSTRACT

A method and system for removing fuel rods from a fuel assembly having top and bottom nozzles that are removed and a plurality of grids for uniformly spacing apart the fuel rods is disclosed. The system includes a rod pushing mechanism which pushes a first end of a selected fuel rod such that a second end of the fuel rod extends out of the fuel assembly. The system also includes a removal device adjacent the second end of the selected fuel rod. The removal device engages and pulls the fuel rod completely from the fuel assembly when the second end of the fuel rod extends out of the fuel assembly a distance sufficient to engage the removal device. The method includes the following steps. First, a first end of a selected fuel rod is pushed such that a second end of the fuel rod extends out of the fuel assembly. Then, the second end of the selected fuel rod is engaged with a removal device. Finally, the selected fuel rod is pulled completely from the fuel assembly with the removal device.

28 Claims, 3 Drawing Sheets

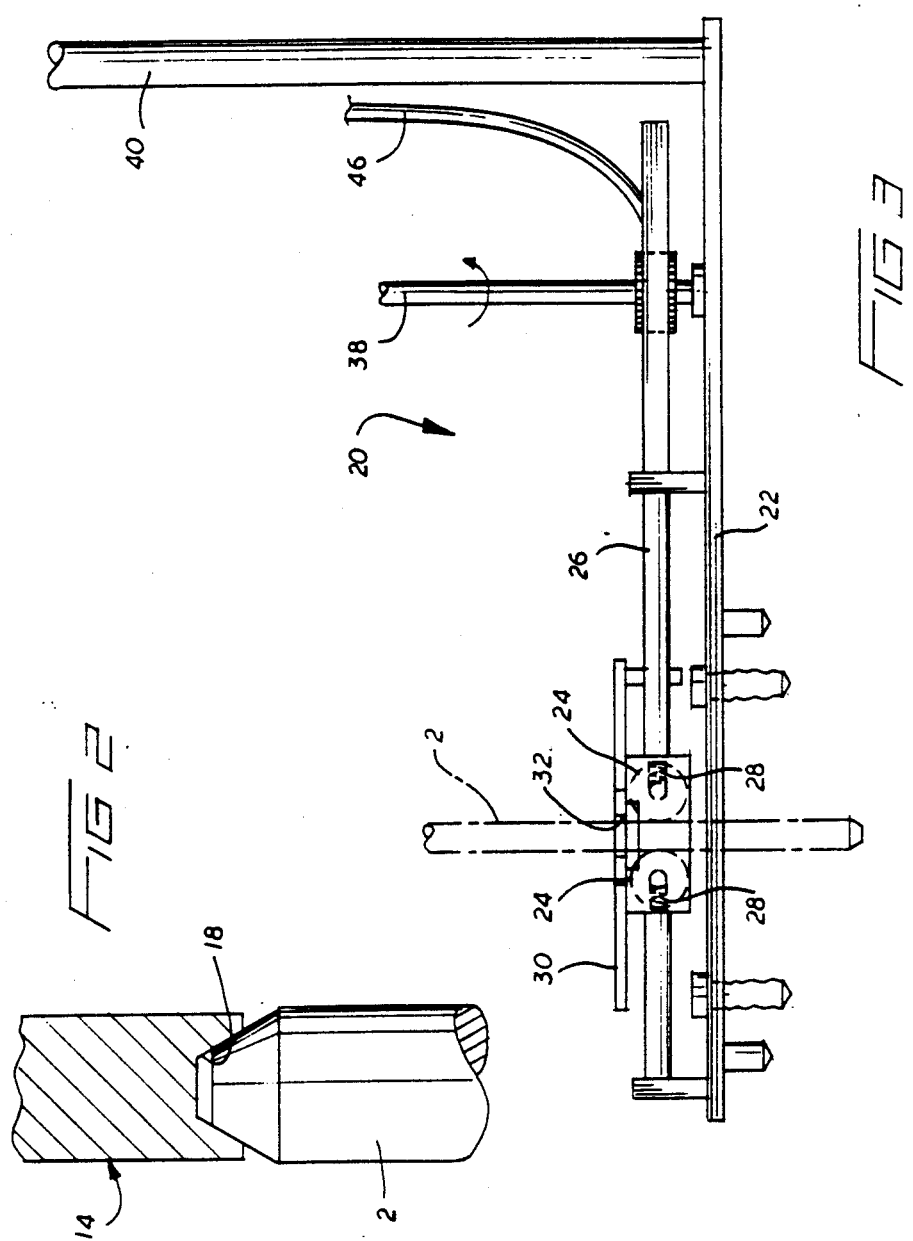

METHOD AND APPARATUS FOR REMOVING THE FUEL RODS OF A NUCLEAR FUEL ASSEMBLY

TECHNICAL FIELD

The present invention concerns both a system and a method for removing the spent fuel rods from a fuel rod assembly. More particularly, the present invention relates to a method and system for removing fuel rods that uses both a pushing and a pulling action.

BACKGROUND OF THE INVENTION

Nuclear fuel rod assemblies generally include between 200 and 290 fuel rods mounted in a square array within a support skeleton. The support skeleton is formed from top and bottom nozzles which are interconnected to each other by sixteen to twenty-four uniformly arrayed thimble tubes. The top and bottom nozzles are eight to nine inches square, and the thimble tubes are about thirteen feet long, so that the overall shape of the fuel assembly is an elongated, rectangular prism. The fuel rods themselves are about twelve feet long. To equidistantly space the long and relatively flimsy fuel rods within the support skeleton, the skeleton includes between seven and nine grids, each of which has a square array of open cells for receiving and spacing the fuel rods. The grids are usually formed from flat plates of interlocking sheet metal in an "eggcrate" configuration which lend compressive strength to the grids with a minimum of weight.

When the fuel assemblies are placed into operation, they are lowered into the reactor core by a crane, and the neutron-absorbing control rods (which are interspersed between the fuel rods) are slidably removed. Pressurized water is conducted through the bottom nozzles of the fuel assemblies to absorb uniformly the heat generated by the nuclear reaction that occurs between the fuel rods. Over a period of time, the nuclear fuel within the fuel rods becomes exhausted, thereby necessitating the removal of the spent fuel assembly from the nuclear core, and the disposal of its fuel rods in the spent fuel pool of the nuclear power plant facility. However, to make optimum use of the limited amount of storage space available in the spent fuel pool, the spent fuel assembly is first taken to a cask loading area of the pool for consolidation. The cask loading area of the pool is approximately forty feet deep, and is filled with water. The water shields from radiation the workers who typically stand on a deck located above the pool.

Once the spent fuel assembly is loaded into the cask loading shaft, the workers remove at least the top nozzle of the assembly, and use a gripping device (such as that disclosed in U.S. Pat. No. 4,651,400 by Shield and commonly assigned to Westinghouse Electric Corporation) to grip and withdraw the spend fuel rods from the fuel assembly in order to load these rods into a storage cannister. Because of the relatively low thermal output of spent fuel rods, empirical studies have shown that they may be packed in parallel contact with one another in a "triangular" array, which is the densest possible arrangement for a plurality of rod-like objects. In this arrangement, the axes of the rods define the corners of equilateral triangles. The triangular arrangement of spent fuel rods advantageously reduces the volume that these rods occupy within the fuel assembly by 50%. This allows the spent fuel pool to hold twice as many spent fuel rods.

Tooling systems for removing the fuel rods from a nuclear fuel rod assembly are known in the prior art. Such tooling systems are often used to remove the spent fuel rods from a fuel rod assembly so that they may be consolidated into a storage cannister, and ultimately placed in the spent fuel pool of the nuclear power plant facility. Such tooling systems typically include a rod gripping mechanism for selectively gripping and ungripping one or more fuel rods in a fuel rod assembly after the top nozzle of the assembly has been removed. The rod gripping mechanism is connected to a crane-like mechanism and operates by lifting the rods out of the assembly by applying a tensile or pulling force, and lowering them into a storage cannister. An example of such a fuel mechanism is disclosed in U.S. Pat. No. 4,651,400. While such fuel rod removal systems are commonly used in the context of spent fuel consolidation processes, they also may be used to remove the unspent fuel rods from a damaged fuel rod assembly during a reassembly-type repair.

Unfortunately, the performance of tooling systems that remove the fuel rods from their respective assemblies by gripping and pulling them out is not without shortcomings. For example, the gripping, raising and lowering of spent fuel rods from such assemblies is a slow and tedious process. While the water in the cask loading area of the pool affords an effective shield for the majority of radiation emanating from the fuel being consolidated, the workers on the deck still receive potentially hazardous radiation largely due to the length of time necessary to complete the consolidation operation. Additionally, the tensile forces applied to the spent fuel rods when they are forcefully pulled out of the grids of the fuel rods assembly can cause the relatively brittle outer tube of Zircaloy® cladding to break, thereby contaminating the water in the spent fuel pool with pellets of radioactive uranium oxide. Finally, the complete withdrawal of the spent fuel rods from the fuel assembly requires these rods to be hoisted upwardly within the spent fuel cask at least fifteen feet. If any of the gripper mechanisms holding the rods should slip at this juncture, one or more of the rods could fall to the bottom of the pool and break.

One system for removing fuel rods from a fuel rod assembly that is both faster and safer than prior art systems is disclosed in U.S. patent application Ser. No. 063,368, filed June 18, 1987 by Ellingson et al., assigned to Westinghouse Electric Corporation, the entire specification of which is incorporated herein by reference. This system is adaptable to any size and most types of fuel rod assemblies now in commercial use and is mechanically simple and reliable despite the differences in sizes of the individual fuel rods. It further minimizes breakage of fuel rods during fuel consolidation. This system removes the fuel rods solely by pushing them through the support skeleton of the fuel assembly after the top and bottom nozzles have been removed. To this end, this system includes a pushing assembly having a push rod for pushing a selected rod out of its respective grid cells. A rod catching device having rod receiving cells and spring clips prevents the pushed out rods from sliding completely through the fuel assembly and falling to the floor of the spent fuel pool.

Existing systems such as this remove the fuel rods in 1-4 hours, which is a substantial improvement over the prior art. This broad range of time is due to the unpredictability of applying the pushing operation to a given set of fuel assemblies. However, to achieve cost and radiation exposure objectives, it would be desirable if the removal operation were consistently performed in less than two hours. Additionally, in existing pushing removal systems, the push rod travels the length of the fuel assembly, approximately 160 inches. This is time consuming and results in the removal of the part of the push rod that contacts the fuel rods from the radiation-shielding water, thereby exposing workers to additional radiation. Finally, such pushing methods and systems may not work with Westinghouse ® optimized fuel or EXXON ® fuel because the pushing tool can snag on the grid dimples in these fuel systems.

SUMMARY OF THE INVENTION

The method and system of the invention overcomes the deficiencies of prior systems by rapidly removing fuel rods from a fuel assembly by both pushing and pulling the rods. Specifically, fuel rods are first pushed partially out of the fuel assembly and are then removed by pulling. The pulling operation may be performed on one or more fuel rods while the next fuel rods are pushed. Additionally, using the present invention, the removal operation may be performed in approximately one hour, and none of the pushing equipment that contacts the fuel is removed from the water. Other advantages are explained in detail below.

The system for removing fuel rods from a fuel assembly operates on a fuel assembly after the top and bottom nozzles of the assembly are removed. The system includes a short stroke rod pushing mechanism which pushes a first end of a selected fuel rod such that a second end of the fuel rod extends out of the support skeleton of the fuel assembly. The system also includes a removal device adjacent the second end of the selected fuel rod. The removal device engages and pulls the fuel rod completely from the fuel assembly when the second end of the fuel rod extends out of the fuel assembly a distance sufficient to engage said removal device.

The method for removing fuel rods from the fuel assembly includes the following steps. First, a first end of a selected fuel rod is pushed such that a second end of the fuel rod extends out of the fuel assembly. Next, the second end of the selected fuel rod engages a removal device. Finally, the selected fuel rod is pulled completely from the fuel assembly with the removal device.

In performing the method, each step is repeated for each fuel rod that is removed. Because removal is a two step process, while one fuel rod is being pulled from the fuel assembly, the next fuel rod may be pushed. The rods are disposed in rows in the grids of the fuel assembly and the rods may be removed by rows. After one row of fuel rods is removed, the removal device is indexed to the next row. Additionally, a plurality of fuel rods may be simultaneously pushed, engaged, or pulled.

The short stroke rod pushing mechanism is disposed above the fuel assembly and includes a push rod having a proximal end and a distal end. A recess is disposed on the distal end to engage and push downwardly a fuel rod. The push rod travels a distance of approximately five inches to push the fuel rod a similar distance. This distance is sufficient to permit the removal device to engage the fuel rod. During the entire process the portion of the push rod that contacts the fuel rod remains under the water. The removal device includes a roller assembly having at least one set of rollers. The set of rollers includes at least two rollers which preferably oppose each other. The rollers rollingly engage the fuel rods after the fuel rods have been pushed downwardly five inches, and are spring mounted on the roller assembly so as to accommodate any variations in the diameter of the fuel rods.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 2 is a sectional side view of a push rod of the pushing mechanism engaging a fuel rod.

FIG. 3 is a sectional side view of the roller assembly of the removal system of the present invention.

DETAILED DESCRIPTION OF PREFERRED EMBODIMENTS

Figure 1:
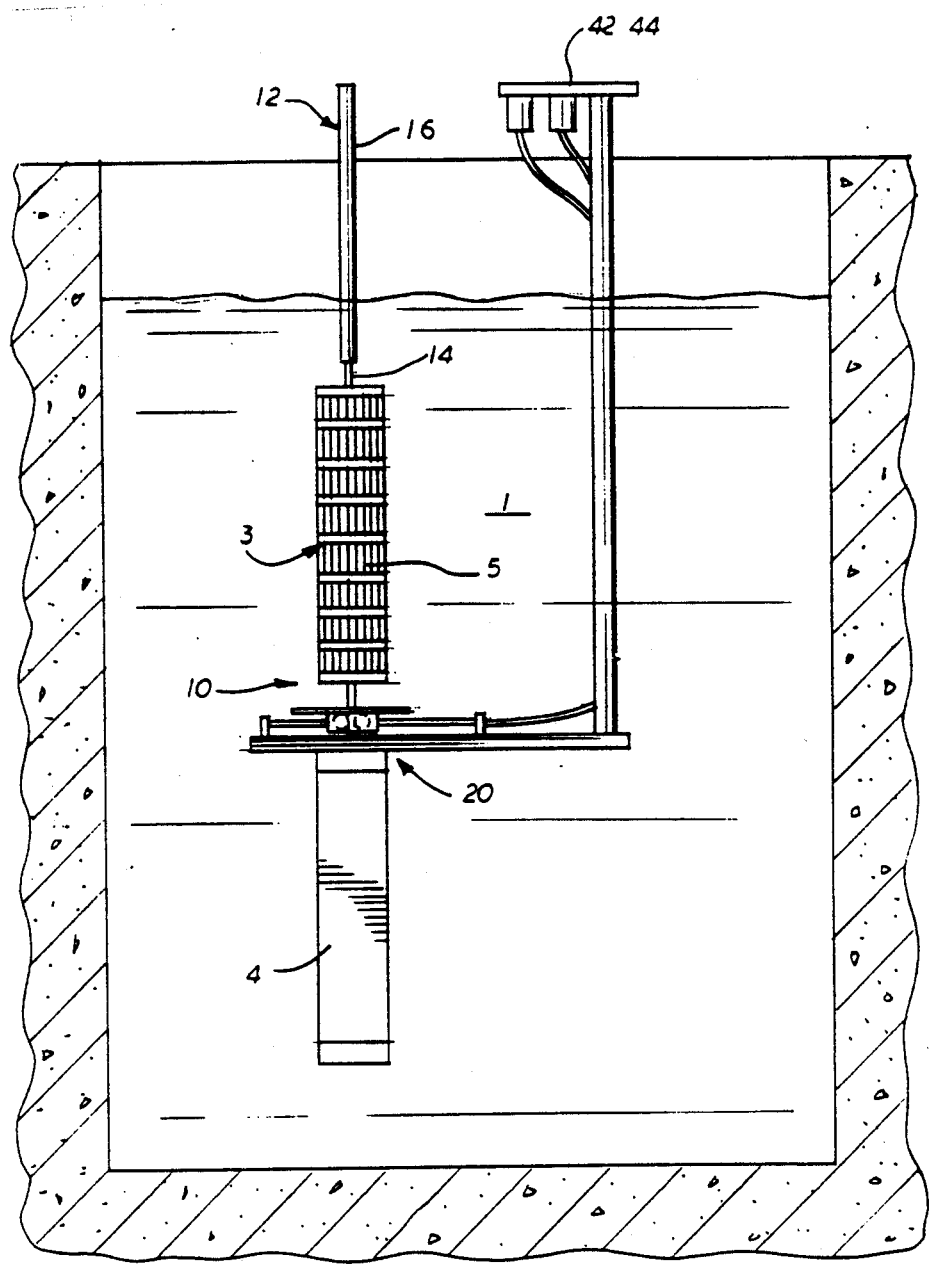
FIG. 1 is a side view of the general arrangement of the fuel rod removal system according to the present invention.

FIG. 1 shows the principal components of the fuel rod removal system 10 of the present invention set up in the cask loading area of spent fuel pool 1 in a nuclear power facility. System 10 removes fuel rods 2 from fuel assembly 3 and disposes fuel rods 2 in transition cannister 4. Fuel assembly 3 may be placed in basket 5 prior to removal of fuel rods 2, as described in the aforementioned U.S. patent application Ser. No. 063,368. Basket 5 can be rotated, raised, and lowered as required for removal of fuel rods 2.

Fuel rod removal system 10 includes two primary subassemblies: the pushing assembly and the pulling assembly. The pushing assembly includes short stroke rod pushing mechanism 12 having push rod 14. Push rod 14 can be mounted at its proximal end on hand held pipe 16. Alternately, push rod 14 may be one of a plurality of push rods of a motorized pushing assembly and may be extended and retracted automatically and indexed by a two dimensional indexer over a selected fuel rod 2. Also, a single push rod 14 can be programmed to push fuel rod 2 and then be indexed to the next fuel rod. The distal end of push rod 14 has a fuel rod engaging recess 18 as shown in FIG. 2.

Figure 4:
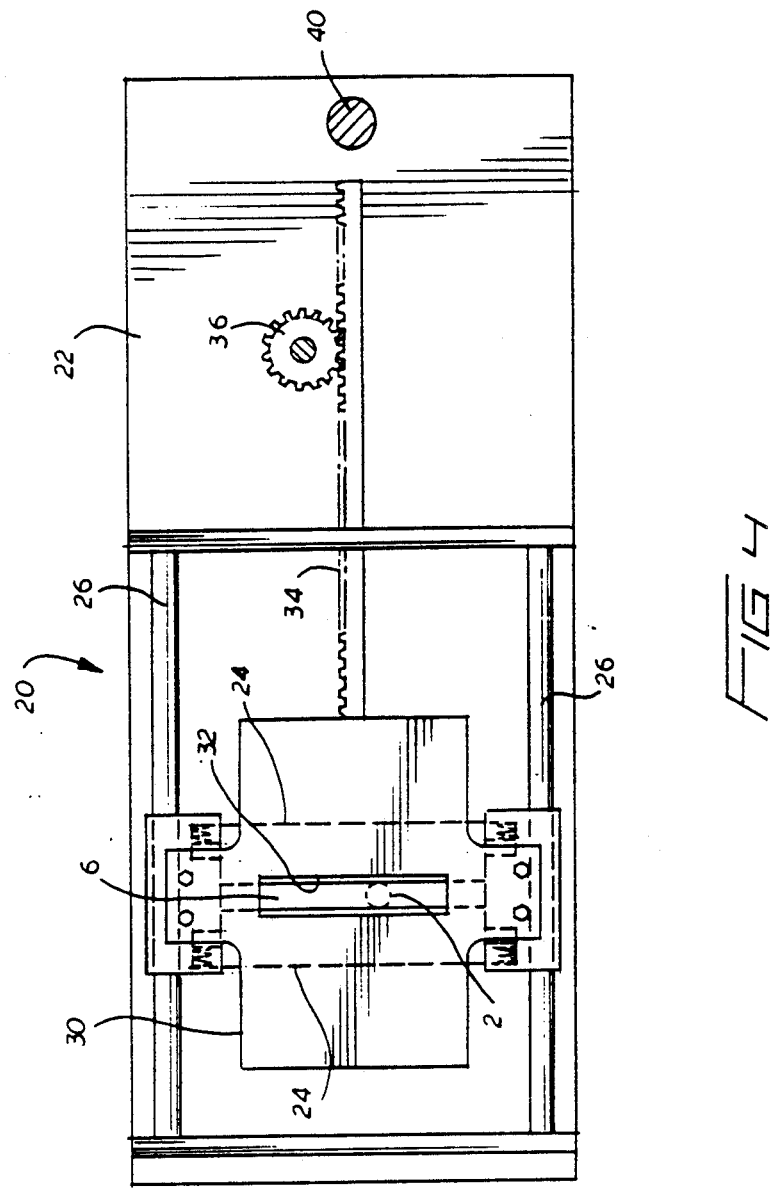
FIG. 4 is a top view of the roller assembly of FIG. 3.

The pulling assembly includes roller assembly 20. As illustrated in FIGS. 3 and 4, support plate 22 of roller assembly 20 is temporarily fastened to the top of transition cannister 4. A pair of rollers 24 is rotatably mounted on guide bar 26 which is mounted on support plate 22. The rollers 24 are mounted via springs 28 which accommodate variations in the diameters of fuel rods 2. The rollers 24 may be made from metal or other materials having high coefficients of friction and high elasticity capable of grabbing simultaneously a plurality of fuel rods 2, and may be formed with grooves to enhance gripping and alignment of the fuel rods. The rollers 24 rollingly engage and pullingly remove fuel rods 2 from fuel assembly 3. They may remove the one fuel rod 2 at a time or may remove simultaneously a plurality of fuel rods 2 from a specific row 6 of fuel assembly 3. In an alternate embodiment, a plurality of pairs of rollers 24 may be used to remove simultaneously fuel rods 2 from a plurality of rows 6 of fuel assembly 3.

Shield plate 30 is attached to guide bar 26 and is disposed above rollers 24 to shield transition cannister 4 from falling debris. Shield plate 30 has a longitudinal slot 32 through which removed fuel rods 2 pass. Guide bar 26 has teeth 34 along one side to form a rack which meshes with pinion 36 formed at one end of indexing shaft 38. Handling frame 40 is mounted on one end of support plate 22 and extends upwardly through spent fuel pool 1 and above deck 7 formed above the pool. Roller drive 42 having fractional horsepower motor 44 and additional controls is mounted on the top of handling frame 40 above deck 7. Drive shaft 46 provides a driving connection from motor 44 to rollers 24.

One sequence for the operation of fuel rod removal system 10 is as follows. First, roller assembly 20 is placed on top of transition cannister 4 by a crane. Pins align roller assembly 20 with transition cannister 4 and bolts fasten roller assembly 20 to the cannister. Transition cannister 4 with roller assembly 20 is moved under fuel assembly 3. Basket 5, with fuel assembly 3 inside, is lowered a few inches to engage pins with transition cannister 4. This aligns the fuel and cannister. Transition cannister 4 is aligned such that when each fuel rod 2 exits fuel assembly 3, it travels several inches and enters into its corresponding tube in the transition cannister 4.

Rollers 24 are moved under the first row of fuel rods 2 by indexing support plate 22. Shield plate 30 above the rollers shields transition cannister 4 from debris that falls from fuel assembly 3 during rod removal. Shield plate 30 also supports loose rods that may fall from the assembly. Slot 32 in shield plate 30 allows only the row of fuel rods 2 being pulled to enter between rollers 24. Roller drive 40 is turned on. Each roller 24 is driven by fractional horsepower motor 44. Motor 44 can rotate one pair of two-inch diameter rollers at 160 rpm to pull a fuel rod from a fuel assembly in 10 seconds. Rollers 24 are spring mounted so they can be pressed against fuel rods 2 and can accommodate slight variations in fuel rod diameter. The first rod 2 in the row is pushed downwardly by push rod 14 until the lower tip of fuel rod 2 is grabbed by rollers 24. The push distance is about 5 inches. Then the next fuel rod 2 is pushed while the previous fuel rod is pulled by rollers 24. The pushing operation is repeated until each rod in the row is removed. Rollers 24 are then moved under the next row and the process is repeated.

Where fuel rods 2 are pushed and pulled one at a time, the time required to remove rods from a 14x14 rod fuel assembly would be about 45 minutes. This is based on a ten-second removal time for each rod, and on a one-minute time to index rollers 4 from one row to the next. The rod pulling time could be shortened by designing rollers 24 to pull several rods simultaneously. The indexing time could be shortened by using more than one pair of rollers 24. Although this system and method is used primarily for fuel consolidation, they can also be used to reassemble a fuel assembly that has a damaged skeleton.

The push and pull method and system of the present invention is much faster than known pushing methods and systems due to the five-inch push distance rather than a 160-inch push distance. The method and system have a demonstrated removal time of one hour for a 14x14 fuel assembly, as compared with an up to four-hour removal time with the best prior systems of which Applicants are aware. There are numerous additional advantages of the present invention as indicated below.

The existing pushing method may not be suitable for consolidating Westinghouse ® optimized fuel or EXXON ® fuel because these fuel systems have grid dimples on which the full length push tool can snag. The tool for the push/pull method of the present invention passes through only one grid instead of all grids. Therefore, the push/pull method and system is superior for consolidating these fuel types.

With existing push systems, the fuel rod could bend and break if it jams during pushing. The pushing and pulling process of the present invention alleviates this concern because the rods are pushed only a short distance (about five inches). The process is also less likely to break a rod than pushing because when pulling a rod, stress is constantly applied to the end plug weld. When using the pushing-pulling techniques, a tensile stress is applied for only a short time when the rollers initially grab the rod. After this, the pulling force is applied to the rod cladding.

Another advantage is that the catch plate can be eliminated because the shield plate over the rollers prevents loose rods from falling too far and because there is no need to maintain the friction that the full distance rod push requires. Since the catch plate in the existing equipment captures debris that frequently impedes rod push, its elimination makes rod removal more consistent. The other function of the catch plate, preventing loose rods from sliding out of the fuel assembly when the basket is rotated, can be performed by a simple door mechanism.

We claim:

1. A system for removing fuel rods from a fuel assembly having top and bottom nozzles that are removed and a plurality of grids for uniformly spacing apart the fuel rods, said system comprising:
    rod pushing means for pushing a first end of a selected fuel rod such that a second end of the fuel rod extends out of the fuel assembly; and
    a removal device adjacent the second end of the selected fuel rod for pulling the fuel rod completely from the fuel assembly when the second end of the fuel rod extends out of the fuel assembly a distance sufficient to engage said removal device, including a roller assembly having at least one roller that rollingly engages said fuel rod to pull it from said fuel assembly.

2. A system according to claim 1 wherein said rod pushing means includes a rod pushing mechanism having a push rod with a proximal end and a distal end.

3. A system according to claim 2 wherein said push rod includes an engagement means disposed on said distal end for engaging the first end of the selected fuel rod.

4. A system according to claim 3 wherein said engagement means includes a recess for receiving the first end of the selected fuel rod.

5. A system according to claim 2 wherein said push rod travels a distance of approximately five inches to thereby push the selected fuel rod a distance of approximately five inches.

6. A system according to claim 2 wherein the fuel assembly is disposed underwater and wherein during the entire removal process said distal end of said push rod remains underwater.

7. A system according to claim 2 wherein said rod pushing mechanism comprises a plurality of push rods.

8. A system according to claim 1 wherein said roller assembly includes at least one set of at least two rollers, at least one said roller in each set being disposed opposite the other said rollers in said set to rollingly and simultaneously engage two sides of the selected fuel rod.

9. A system according to claim 8, wherein each said roller has a fuel rod engaging surface that engages the fuel rod at more than one point to maintain the fuel rod in alignment.

10. A system according to claim 8 wherein said rollers are spring mounted on said roller assembly to press said rollers against the selected fuel rod and to accommodate variations in the diameter of the fuel rod 11. A system according to claim 10 wherein said roller assembly further includes a support plate and a shield plate, said rollers being mounted on said support plate, and said shield plate being mounted over said rollers.

12. A system according to claim 8 wherein said roller assembly further includes indexing means for disposing said rollers below fuel rods to be removed.

13. A system according to claim 12 wherein said indexing means comprises a rack and pinion assembly.

14. A system according to claim 8 further comprising a roller drive for rotating said rollers.

15. A method for removing fuel rods from a fuel assembly having top and bottom nozzles that are removed and a plurality of grids for uniformly spacing apart the fuel rods, said method comprising the steps of:
pushing a first end of a selected fuel rod such that a second end of the fuel rod extends out of the fuel assembly;
rollingly engaging the second end of the selected fuel rod with the roller of a roller assembly to apply a pulling force to the rod;
pulling the selected fuel rod completely from the fuel assembly.

16. A method according to claim 15 wherein a plurality of fuel rods are removed from the fuel assembly, and the method further comprises the step of repeating said pushing, engaging, and pulling steps for each fuel rod.

17. A method according to claim 16 wherein while said engaging and pulling steps are performed on a first fuel rod said pushing step is performed on a second fuel rod.

18. A method according to claim 16 wherein each said pushing, engaging, and pulling step is performed simultaneously on a plurality of different fuel rods.

19. A method according to claim 16 wherein the fuel rods are arranged in rows in the grids of the fuel assembly, and the method further comprises the step of indexing the roller assembly from a first row of fuel rods to a second row of fuel rods after all of the fuel rods in the first row have been removed.

20. A method according to claim 15 wherein the selected fuel rod is pushed using a short stroke rod pushing mechanism.

21. A method according to claim 20 wherein the short stroke rod pushing mechanism is disposed above the fuel assembly and pushes the fuel rod downwardly.

22. A method according to claim 20 wherein the short stroke rod pushing mechanism comprises a push rod having a proximal and a distal end.

23. A method according to claim 22 wherein the push rod comprises an engagement means disposed on the distal end for engaging the first end of the selected fuel rod.

24. A method according to claim 23 wherein the engagement means comprises a recess for receiving the first end of the selected fuel rod.

25. A method according to claim 20 wherein the push rod travels a distance of approximately five inches to thereby push the selected fuel rod downwardly a distance of approximately five inches.

26. A method according to claim 22 wherein the fuel assembly is disposed underwater and during the entire removal process the distal end of the push rod remains underwater.

27. A method according to claim 15, wherein the roller assembly comprises at least one set of at least two rollers, at least one roller in each set being disposed opposite the other rollers in each set to rollingly and simultaneously engage both sides of the selected fuel rod.

28. A method according to claim 27 wherein the rollers are spring mounted on the roller assembly to press the rollers against the selected fuel rods and to accommodate variations in the diameter of the fuel rods.

* * * * *